July 18, 1944.   B. F. LANGER ET AL   2,354,130
STRAIN MEASURING SYSTEM
Filed Nov. 19, 1942
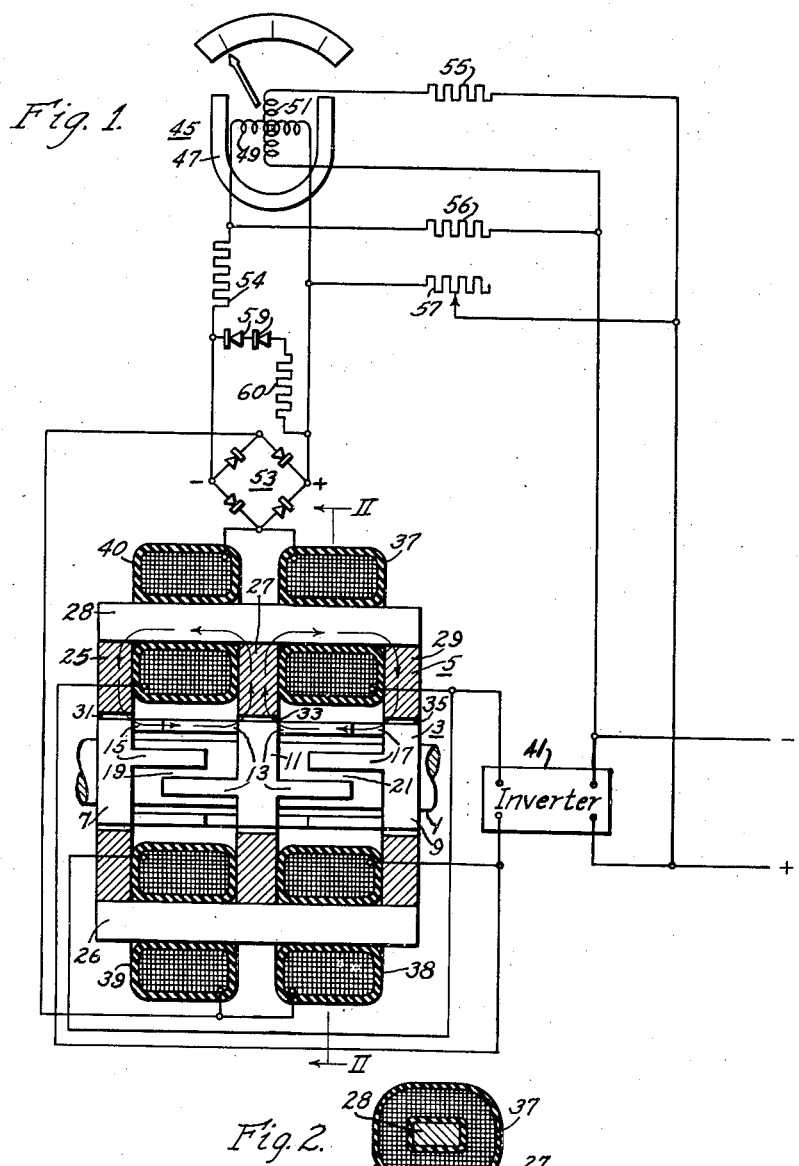
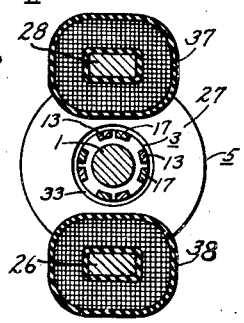
Fig. 1.
Fig. 2.
WITNESSES:
Leon M. Garman
E. F. Oberheim.
INVENTOR
Bernard F. Langer, and
Thomas E. Browne Jr.
BY
Paul E. Friedemann
ATTORNEY Patented July 18, 1944

2,354,130

UNITED STATES PATENT OFFICE 2,354,130

STRAIN MEASURING SYSTEM

Bernard F. Langer, Pittsburgh, and Thomas E. Browne, Jr., Wilkinsburg, Pa., assignors to Westinghouse Electric & Manufacturing Company, East Pittsburgh, Pa., a corporation of Pennsylvania Application November 19, 1942, Serial No. 466,149

11 Claims. (Cl. 265—25)

The present invention relates, generally, to systems for continuously indicating or measuring the deflection or strain of a member subject to a stress.

More particularly, the present invention relates to a system of the character mentioned which employs a magnetic type of strain gauge to produce a voltage or current or a change of voltage or current which is indicative of the deflection being measured, the strain gauges in most applications being secured to the member being deflected so that the strain gauge elements may be subjected to movements equivalent to the deflections of the member.

The present invention is closely related to a copending application of B. F. Langer entitled "Strain measuring system," Serial No. 466,147, filed November 19, 1942. Portions of the descriptive material appearing in the above-identified application have been included in the present application for the purpose of completeness.

The deflection or strain measuring system as hereinafter described and illustrated in the drawing is specifically adapted for measuring the torsional deflections or twist of a shaft subject to torque, for the purpose of indicating the torque being transmitted by the shaft. It is not to be construed, however, that the invention is limited to this application alone, since other forms of strain gauges may be substituted for that illustrated to measure the deflection or strain of a member subject to either tension or compression loading. For an example, reference may be had to the strain gauge illustrated in Patent 2,231,702, S. L. Burgwin, et al. It will be apparent, however, to one skilled in the art that the specific invention illustrated in the drawing for measuring the torque of a shaft provides accurate torque indication in a degree hitherto unobtainable.

A principal object of the present invention is to provide a system for measuring the deflection or strain of a member subject to a stress which shall function simply and efficiently and have a minimum number of parts.

Another object of the present invention is to provide a deflection measuring system of the character referred to which shall compensate for voltage fluctuations of the source of applied potential.

Another object of the present invention is to provide a deflection or strain measuring system of the character referred to which shall be insensitive to changes in ambient temperature.

Another object of the present invention is to provide a strain gauge control circuit in which a substantially linear relationship between the quantity or voltage to be measured and the current in the indicating instrument coils is obtained.

A specific object of the present invention is to provide a torque measuring system employing a magnetic strain gauge for picking up the shaft deflection wherein a source of direct potential is utilized to supply the system.

Other objects and advantages will become more apparent from a study of the following specification when considered in conjunction with the accompanying drawing, in which:

Figure 1 illustrates a torque measuring system embodying the principles of this invention; and Fig. 2 is a reduced sectional view taken on the line II—II of the strain gauge of Fig. 1.

The specific strain gauge or torque measuring device schematically illustrated in the drawing is described in detail in a copending application of B. F. Langer and F. W. Godsey, Jr., Serial No. 458,378, entitled "Torque measuring devices for shafts" and only such description which is necessary for a complete understanding of the construction and operation of the strain gauge will be included in this specification.

Referring now to Figs. 1 and 2 of the drawing, numeral 1 denotes a shaft, the torque of which is to be measured; numeral 3 denotes a rotor assembly secured to the shaft and which, in effect, forms the armature member of the strain gauge; and numeral 5 denotes a stationary member having ring members which are concentrically positioned about the rotor assembly 3, and, in effect, forms the core assembly of the strain gauge.

The rotor assembly 3 comprises a pair of axially spaced torque rings 7 and 9 secured to the shaft on bushings (not shown) of nonmagnetic material so that a circulating magnetic flux will not include the shaft if the shaft is made of steel or other magnetic material. Centrally disposed between the torque rings 7 and 9 is a third ring 11 termed a reference ring likewise supported and secured to the shaft on a bushing (not shown) of nonmagnetic material. The three rings thus secured to the shaft are so axially spaced and supported that a known gauge-length of shaft is included therebetween. The reference ring 11 has secured thereto a plurality of axially extending fingers 13 which extend axially on each side of the ring in the same axial plane. Each of the torque rings 7 and 9 have a plurality of axially extending fingers 15 and 17 which are of sufficient length to overlap the extremities of the fingers 13 associated with reference ring 11. The confronting faces of the cooperating fingers of the three rings are so positioned during assembly that a small air gap is included therebetween and the above-described assembly is such that, for example, if torque were assumed to be transmitted from left to right of the shaft in a clockwise direction, torsional deflections of the shaft between the torque ring 7 and the reference ring 11 would so displace the fingers 15 relative to the fingers 13 cooperating therewith that the air gap 19 formed therebetween would be decreased and the torsional deflections of the shaft between reference ring 11 and torque ring 9 would so displace the fingers 17 relative to the fingers 13 cooperating therewith that the air gap 21 formed therebetween would be increased.

The stationary member 5 comprises three ring elements 25, 27 and 29 each of which is positioned to be included in a transverse plane defined by one of the shaft ring elements, and are axially interconnected in diametrically opposite positions on their outer peripheries by the rectangular bars 26 and 28. The inner bores of the ring elements are of such diameter that small annular air gaps 31, 33 and 35 are formed between the peripheries of the concentrically positioned confronting faces.

Disposed about each rectangular bar section between the axially spaced rings 25, 27 and 29 are the coils 37, 38, 39 and 40 which are each connected as one leg in a conventional bridge circuit. That is, coil 37 is included in one leg and coil 38 is included in a diametrically opposite leg. Coil 39 is included in a third leg and coil 40 in the diametrically opposite leg. Upon suitable energization of the coils from the source of alternating potential provided by the vibrator inverter 41 of any well-known type connected across the input terminals of the bridge circuit and the source of direct potential, a flow of alternating magnetic flux may be induced to flow in the stationary member 5 and the rotor assembly 3 in the instantaneous directions indicated by the arrows and for zero torque of the shaft the bridge circuit is in a balanced condition since the impedances of the coils are matched. It may now, therefore, be seen that upon torsional deflection of the shaft due to clockwise torque from left to right of the shaft as previously described, the air gaps 19 will be decreased while the air gaps 21 will be increased to substantially proportionally change the values of the alternating magnetic fluxes associated with each of the coils. The alternating magnetic fluxes associated with coils 37 and 38, for example, being decreased while the alternating magnetic fluxes associated with coils 39 and 40 are increased. Thus the impedance of one pair of coils will be increased while the impedance of the other pair of coils will be decreased to cause a voltage difference to appear between the pairs of coils. This voltage difference is therefore measurable across the output terminals of the strain gauge bridge circuit.

The indicating instrument 45 is preferably of the cross coil type and is illustrated diagrammatically. It comprises a stationary permanent magnet 47 and a movable armature positioned to be influenced by the field of the magnet. The armature of the instrument includes a pair of coils 49 and 51 mounted at an angle with respect to each other; the arrangement being such that both coils control the movements of the pointer to provide an indication corresponding to the opposed effects produced by the currents in the coils. Interconnecting the coil 49 of the indicating instrument with the output terminals of the strain gauge bridge circuit is a circuit comprising a bridge rectifier 53 having its input terminals connected across the output terminals of the strain gauge bridge circuit, its negative terminal through resistors 54 connected to one side of the coil 49 and its positive terminal connected to the other side of coil 49. The second coil 51 of the indicating instrument is connected to the source of direct potential by a circuit including a resistor 55. A further circuit, including a resistor 56 and an adjustable rheostat 57, is provided for the purpose of providing a direct current bias on the instrument coil 49 whereby a zero setting of the indicating instrument is obtainable by suitable adjustment of the rheostat 57. The resistor 56 is provided to limit the current in the coil 49 to a safe value in the event that all the resistance is cut out of the rheostat 57.

It will be noted upon an inspection of Fig. 1 that both coils 49 and 51 of the indicating instrument 45 are subject to voltage applications from the same source of direct potential. Since, as previously mentioned, the instrument provides an indication corresponding to the opposed effects produced by the currents circulating in the coils, variations in the source of direct potential will equally affect both coils of the instrument due to the circuit arrangement, and as a consequence thereof produce no change of indication as would be the case were only one of the coils affected.

It is a well-known fact that copper oxide rectifiers have resistance characteristics which vary with the current passing through them; the resistance characteristics also vary with changes in temperature. Such variations are, of course, very undesirable, since any variation from a linear relationship of the voltage supply to the current flowing in the indicating instrument coils will produce a false indication of the quantity to be measured. In order to compensate or correct for this nonlinear resistance characteristic, a shunting circuit comprising a pair of shunting discs or rectifier elements 59, the equivalent of those used in the bridge rectifier, and a resistor 60 in series therewith is connected across the output or positive and negative terminals of the bridge rectifier 53. The resistor 60 is selected to have a resistance value substantially equivalent to that of the circuit on the alternating current side of the bridge rectifier so that the overall resistance value of the shunting circuit will correspond to the resistance value of the bridge rectifier elements and the alternating current circuit associated therewith. The resistance value of the series resistor 54 should be of some value greater than the combined resistance of the rectifier elements 59 and resistor 60 in the shunting circuits associated with each, thus for each half-cycle of alternating current, current will flow from the positive terminal of the bridge rectifier through the indicating instrument coil in circuit therewith. Since resistance characteristics in the shunting circuit are substantially equivalent to those of the corresponding rectifier and alternating current circuit, it will be seen that changes in the characteristic of the bridge rectifier circuit due either to variations in current or in temperature will be substantially duplicated in the changing characteristics of the shunting circuit. Thus, for example, as increasing currents produce a corresponding decrease in resistance in the bridge rectifier, the rectifier elements of the shunting circuit will likewise decrease in resistance with the increase in current, thereby diverting a proportionally greater amount of current from the coil of the indicating instrument associated therewith. In short, since the indicating instrument coil taps the mid-point of the voltage drop across the input terminals of the associated bridge rectifier, equal changes of resistance of the bridge rectifier and the shunt circuit rectifiers will not affect the voltage impressed across the associated instrument coil. Similar considerations, of course, apply to variations of the rectifier resistance characteristic due to temperature changes.

Accurate voltage or current and temperature compensation in the instrument coil circuit depends upon the proper relationship between the current flowing in the shunting discs or rectifier elements 59 and that flowing in the instrument coil. This relationship can be established in each circuit by proper selection of the shunt circuit resistor 60 and the series resistor 54.

The operation of the above described apparatus may be set forth as follows: Upon transmission of torque by the shaft, the air gaps 19 and 21, as previously described, will change, one increasing while the other decreases depending upon the direction of the torsional deflection of the shaft. This changes the values of the alternating magnetic fluxes linked with each of the coils to cause a corresponding change of impedance in the pairs of coils whereby a voltage difference appears between the pairs of coils as previously described. Thus a voltage difference is caused to appear across the output terminals of the bridge circuit and a voltage proportional to this voltage difference or unbalance of the bridge circuit is impressed across the coil 49 of the indicating instrument.

The coil 51 of the indicating instrument produces a flux component proportional to the applied direct potential and the coil 49 produces a flux component proportional to the difference of voltage or unbalance existing across the output terminals of the bridge circuit. The resultant of these two flux components causes the armature or crossed coil assembly of the instrument to rotate to a position in which the resultant lines up with the magnetic field produced by the permanent magnet 47. Since both flux components depend upon the source of direct potential, the effect of variations in the source of direct potential is eliminated since the flux resultant with respect to the instrument armature depends only upon the relative magnitudes of the flux components. The deflection of the pointer of the instrument 45 is, therefore, in view of the compensation for the variations in the source of direct potential and the previously described compensation for the nonlinear resistance characteristics of the bridge rectifier, entirely dependent upon the degree of unbalance of the bridge circuit which unbalance being directly proportional to the torsional deflection or torque of the shaft provides an indication accurately indicative of the torque being transmitted.

The foregoing disclosure and the showings made in the drawing are merely illustrative of the principles of this invention and are not to be interpreted in a limited sense. The only limitations are to be determined from the scope of the appended claims.

We claim as our invention:

1. A system for measuring the deflections of a member subject to a stress comprising, in combination, electrical coil means, a source of direct potential, conversion means for converting said direct-potential to an alternating potential for energizing said electrical coil means, means in flux linkage with said electrical coil means adapted to vary a voltage in said electrical coil means in an amount indicative of the deflections of said member, a meter comprising a first and a second internal circuit providing an indication corresponding to the opposed effects produced by the currents in said internal circuits, a first circuit including a rectifier network interconnecting said first internal circuit of said meter with said electrical coil means whereby said first internal circuit of said meter has applied thereacross a voltage corresponding to a change in voltage in said electrical coil means, a second circuit interconnecting said second internal circuit of said meter with said source of direct potential, said rectifier network in said first circuit comprising a bridge rectifier and a shunting circuit across the output terminals thereof including a plurality of rectifier elements and resistance means in series therewith, said shunting circuit having a characteristic of compensating for resistance variations with current variations in said bridge rectifier.

2. A system for measuring the deflections of a member subject to a stress comprising, in combination a bridge circuit, at least four electrical coils each included as one leg in said bridge circuit, a source of direct potential, means connected across said source of direct potential for converting said direct potential to an alternating potential for energizing said bridge circuit, means in flux linkage with said electrical coils adapted to increase a voltage in one pair of electrical coils in opposite legs of said bridge circuit and decrease a voltage in the other pair of coils included in the other opposite legs of said bridge circuit in an amount corresponding to the deflections of said member, a meter comprising a first and a second internal circuit providing an indication corresponding to the opposed effects produced by the currents in said internal circuits, a first circuit including a rectifier network having a substantially linear resistance characteristic interconnecting said first internal circuit of said meter with the output terminals of said bridge circuit, a second circuit interconnecting said second internal circuit of said meter with said source of direct potential, and a third circuit interconnecting said first internal circuit of said meter with said source of direct potential whereby said first internal circuit of said meter has a direct current bias applied thereacross.

3. Apparatus of the character set forth in claim 2 in which the rectifier network in said first circuit comprises a bridge rectifier and a shunting circuit connected across the output terminals thereof, said shunting circuit including a pair of rectifier elements and a resistor element in series therewith.

4. Apparatus of the character set forth in claim 2 in which said means in flux linkage with said electrical coils comprises a core assembly associated with said electrical coils and an armature member cooperating with said core member.

5. A system for continuously measuring the torque transmitted by a shaft comprising, in combination, a rotatable shaft subject to torque, stationary electrical coil means, a source of direct potential, electromechanical means adapted to convert said direct potential to an alternating potential for energizing said electrical coil means, a magnetic flux path including an alternating magnetic flux linked with said electrical coil means, means operable upon elastic deformation of said shaft due to torque for altering the flux linkage with said electrical coil means, thereby changing the value of a voltage in said electrical coil means in an amount corresponding to the elastic deformation of said shaft, a meter comprising a first and a second internal circuit providing an indication corresponding to the opposed effects produced by the currents in said internal circuits, a first circuit including a rectifier interconnecting said first internal circuit of said meter with said electrical coil means whereby said first internal circuit of said meter has applied thereacross a voltage corresponding to a change in voltage of said electrical coil means, a second circuit interconnecting said second internal circuit of said meter with said source of direct potential, and means for producing a direct current bias on said first internal circuit varying in magnitude with variations in said source of direct potential whereby a zero setting of said indicating instrument is obtained.

6. A system for continuously measuring the torque transmitted by a shaft comprising, in combination, a rotatable shaft subject to torque, a rotor assembly secured to rotate with said shaft, a stationary member disposed in close proximity to said rotor assembly, electrical coil means associated with said stationary member, a source of direct potential, an electrical inverter connected to said source of direct potential for producing an alternating potential for energizing said electrical coil means, said electrical coil means being in flux linkage with said stationary member and said rotor assembly upon energization thereof, means included in said rotor assembly for changing the value of the flux linkage when said shaft is subject to torque in an amount corresponding to the torque of said shaft, thereby changing the value of a voltage in said electrical coil means, a meter comprising a first and a second internal circuit providing an indication corresponding to the opposed effects produced by the currents in said internal circuits, a first circuit including a rectifier interconnecting said first internal circuit of said meter with said electric coil means whereby said first internal circuit of said meter has applied thereacross a voltage corresponding to a change in voltage of said electrical coil means, means for producing a direct current bias on said first internal circuit of said meter corresponding in value to said source of direct potential, and a second circuit interconnecting said second internal circuit of said meter with said source of direct potential.

7. A system for continuously measuring the torque being transmitted by a shaft comprising, in combination, a rotatable shaft subject to torque, a rotor assembly having relatively displaceable elements secured to rotate with said shaft, a stationary member disposed in close proximity to said rotor assembly, electrical coil means associated with said stationary member, a source of direct potential, a vibrator inverter having a substantially constant frequency connected to said source of direct potential for producing an alternating potential, circuit means interconnecting said vibrator inverter with said electrical coil means whereby said electrical coil means is energized with said alternating potential, said electrical coil means being adapted to induce a flow of alternating magnetic flux in said stationary member and said rotor assembly upon energization thereof, said elements in said rotor assembly being adapted to change the value of said alternating magnetic flux upon relative displacement thereof due to torque thereby changing the value of a voltage in said electrical coil means, a meter comprising a first and a second internal circuit providing an indication corresponding to the opposed effects of currents in said internal circuits, a first circuit including a rectifier interconnecting said first internal circuit of said meter with said electrical coil means whereby said first internal circuit of said meter has applied thereacross a voltage corresponding to a change in voltage of said electrical coil means, and a second circuit interconnecting said second internal circuit of said meter with said source of direct potential.

8. A system for continuously measuring the torque transmitted by a shaft comprising, in combination, a shaft subject to torque, a rotor assembly secured to rotate with said shaft, a stationary member, at least two coils secured to said stationary member, a source of direct potential, means for converting said direct potential to an alternating potential of substantially constant frequency for energizing said coils, said coils being adapted to induce flows of alternating magnetic flux in said stationary member and said rotor assembly such that each coil has an alternating magnetic flux linked therewith, said coils having voltages therein of substantially equal value when said shaft is not subject to torque, means included in said rotor assembly responsive to torsional deflections of said shaft due to torque for changing the values of the alternating magnetic fluxes linked with each of said coils such that a voltage difference appears between the coils, a meter comprising a first and a second internal circuit providing an indication corresponding to the opposed effects of currents in said internal circuits, a first circuit including a rectifier interconnecting said first internal circuit of said meter with said coils whereby said first internal circuit has applied thereacross a voltage corresponding to the voltage difference between said coils, and a second circuit interconnecting said second internal circuit of said meter with said source of direct potential.

9. A system for continuously measuring the torque transmitted by a shaft comprising, in combination, a rotatable shaft subject to torque, a rotor assembly secured to rotate with said shaft, a stationary member, at least two coils secured to said stationary member, a Wheatstone bridge circuit including each of said coils as one leg thereof, a source of direct potential, means connected to said source of direct potential for producing an alternating potential of substantially constant frequency for energizing said bridge circuit, said coils being adapted to induce flows of alternating magnetic flux in said stationary member and said rotor assembly such that each coil has an alternating magnetic flux linked therewith, said coils having voltages therein of substantially equal value when said shaft is not subject to torque, means included in said rotor assembly responsive to torsional deflection of said shaft due to torque for changing the value of the alternating magnetic fluxes linked with said coils such that a voltage difference appears between the coils, a meter comprising a first and a second internal circuit providing an indication corresponding to the opposed effects produced by the currents in said internal circuits, a first circuit including a rectifier network interconnecting said first internal circuit of said meter with said Wheatstone bridge circuit whereby said first internal circuit of said meter has applied thereacross a voltage corresponding to the unbalance of said bridge circuit which is the difference voltage of said coils, a second circuit interconnecting said second internal circuit of said meter with said source of direct potential, and means for producing a direct current bias on said first internal circuit of said meter varying in magnitude with the variations in said source of direct potential whereby a zero setting of said meter is obtained.

10. Apparatus of the character set forth in claim 9 in which said means included in said rotor assembly comprises a plurality of axially extending finger members supported upon axially spaced ring-like elements secured to said shaft, each finger of one axially spaced ring-like element being positioned in close proximity to a cooperating finger of another axially spaced ring-like element such that a small air gap is formed therebetween.

11. Apparatus of the character set forth in claim 9 in which said rectifier network comprises a bridge rectifier having its input terminals connected across the output terminals of said bridge circuit and a shunting circuit shunting the output terminals of said bridge rectifier, said shunting circuit comprising a plurality of rectifier elements and a resistor element in series therewith.

BERNARD F. LANGER.
THOMAS E. BROWNE, JR.